US008404204B2

(12) United States Patent
Sergi et al.

(10) Patent No.: US 8,404,204 B2
(45) Date of Patent: Mar. 26, 2013

(54) GRANULATE HAVING PHOTOCATALYTIC ACTIVITY AND METHODS FOR MANUFACTURING THE SAME

(75) Inventors: Marino Sergi, Turin (IT); Christian Egger, Pralormo (IT)

(73) Assignee: Rockwood Italia SpA, Turin (IT)

( * ) Notice: Subject to any disclaimer, the term of this patent is extended or adjusted under 35 U.S.C. 154(b) by 9 days.

(21) Appl. No.: 12/518,977

(22) PCT Filed: Mar. 31, 2008

(86) PCT No.: PCT/EP2008/053852
§ 371 (c)(1),
(2), (4) Date: May 10, 2010

(87) PCT Pub. No.: WO2009/121395
PCT Pub. Date: Oct. 8, 2009

(65) Prior Publication Data
US 2011/0091367 A1    Apr. 21, 2011

(51) Int. Cl.
```
B01D 53/56   (2006.01)
B01D 53/86   (2006.01)
B01J 8/00    (2006.01)
B01J 23/00   (2006.01)
B01J 21/00   (2006.01)
B01J 29/00   (2006.01)
B01J 37/00   (2006.01)
C01B 21/00   (2006.01)
C09C 1/00    (2006.01)
C09C 1/44    (2006.01)
C09C 1/36    (2006.01)
C09C 1/22    (2006.01)
```
(52) U.S. Cl. ....... 423/239.1; 502/84; 502/183; 502/185; 502/242; 502/250; 502/253; 502/256; 502/257; 502/260; 502/305; 502/306; 502/307; 502/308; 502/309; 502/310; 502/313; 502/314; 502/316; 502/319; 502/326; 502/328; 502/329; 502/336; 502/338; 502/343; 502/349; 502/350; 502/352; 502/406; 502/411; 502/439; 106/436; 106/439; 106/440; 106/456; 106/457; 106/472; 106/474; 106/475

(58) Field of Classification Search .................. 106/436, 106/439, 440, 456, 457, 472, 474, 475; 502/183, 502/185, 242, 250, 253, 256, 257, 260, 305–310, 502/313–314, 316, 319, 326, 328, 329, 336, 502/338, 343, 349, 350, 352, 406, 411, 439, 502/84; 423/239.1
See application file for complete search history.

(56) References Cited

U.S. PATENT DOCUMENTS

| | | |
|---|---|---|
| 2,732,310 A | 1/1956 | Miller |
| 4,175,110 A | 11/1979 | Tolley |
| 4,277,288 A | 7/1981 | Lawrence |
| 4,946,505 A | 8/1990 | Jungk |
| 5,837,050 A | 11/1998 | Okuda |
| 5,872,072 A * | 2/1999 | Mouri et al. .................. 502/208 |
| 6,136,186 A | 10/2000 | Gonzalez-Martin |
| 6,426,312 B1* | 7/2002 | Lush ............................... 502/84 |
| 6,492,298 B1* | 12/2002 | Sobukawa et al. ............ 502/325 |
| 6,562,120 B2 | 5/2003 | Emery |
| 6,566,300 B2 | 5/2003 | Park |
| 6,632,771 B1* | 10/2003 | Maekawa et al. ............. 502/239 |
| 6,890,373 B2* | 5/2005 | Nemoto et al. .................... 95/90 |
| 6,956,006 B1 | 10/2005 | Mirsky |
| 6,997,570 B2* | 2/2006 | Nakaho ......................... 359/883 |
| 7,879,136 B2* | 2/2011 | Mazyck ............................ 95/27 |
| 2001/0006933 A1 | 7/2001 | Nagasaki |
| 2001/0036897 A1* | 11/2001 | Tsujimichi et al. ............... 502/1 |
| 2002/0182334 A1* | 12/2002 | Marzolin et al. .............. 427/421 |
| 2002/0185040 A1 | 12/2002 | Egger |
| 2003/0037705 A1 | 2/2003 | Hartmann |
| 2003/0066458 A1 | 4/2003 | Emery |
| 2004/0040469 A1 | 3/2004 | McAulay |
| 2004/0072684 A1* | 4/2004 | Tsujimichi et al. ........... 502/242 |
| 2004/0120884 A1 | 6/2004 | Sherman |
| 2004/0131852 A1 | 7/2004 | Shimo |
| 2006/0171877 A1* | 8/2006 | Dadachov ..................... 423/610 |
| 2007/0181167 A1 | 8/2007 | Muradov |

FOREIGN PATENT DOCUMENTS

| | | |
|---|---|---|
| AU | B5470590 | 11/1990 |
| DE | 2940156 A1 | 10/1979 |
| DE | 3619363 A1 | 10/1987 |
| DE | 3918694 C1 | 10/1990 |
| DE | 102005052397 A1 | 5/2006 |
| EP | 0191278 A2 | 8/1986 |
| EP | 0282329 A1 | 9/1988 |
| EP | 0396975 A2 | 11/1990 |
| EP | 0567882 A1 | 11/1993 |
| EP | 0657511 A1 | 6/1995 |
| EP | 0666107 A2 | 8/1995 |

(Continued)

OTHER PUBLICATIONS

Sato, Solvotherman Synthesis of Visible Light Resopnsive Nitrogen-Doped Titania Nanocrystals, A Novel Method of Advanced Materials Processing, J. Mater Sci 41, 2006, pp. 1433-1438.

Yamabi, Crystal Phase Control for Titanium Dioxide Films by Direct Deposition in Aqueous Solutions, Chem. Mater. vol. 14, No. 2, 2002, pp. 609-614.

(Continued)

*Primary Examiner* — Cam N. Nguyen
(74) *Attorney, Agent, or Firm* — McAndrews, Held & Malloy Ltd.

(57) ABSTRACT

The present invention is directed to a granulate having photocatalytic activity, comprising particles of an inorganic particulate material coated with a photocatalytically active compound for introducing photocatalytic activity into or on building materials. The invention is further related to the manufacture of such a granulate and its use into or on building materials such as cement, concrete, gypsum and/or limestone and water-based coatings or paints for reducing an accumulation and growth of microorganisms and environmental polluting substances on these materials and thus reducing the tendency of fouling, while the brilliance of the color is maintained and the quality of the air is improved.

16 Claims, No Drawings

FOREIGN PATENT DOCUMENTS

| | | | |
|---|---|---|---|
| EP | 1413607 | A2 | 4/2004 |
| EP | 1620512 | A1 | 11/2004 |
| EP | 1559753 | A2 | 3/2005 |
| EP | 1726566 | A2 | 11/2006 |
| GB | 2425075 | A | 10/2006 |
| JP | 2001179109 | | 7/2001 |
| JP | 2002201059 | | 7/2002 |
| JP | 2004130156 | | 4/2004 |
| JP | 2004161978 | | 6/2004 |
| JP | 2004277235 | | 7/2004 |
| JP | 2004231927 | | 8/2004 |
| WO | 0153228 | | 7/2001 |
| WO | 0171121 | A1 | 9/2001 |
| WO | 0238272 | A1 | 5/2002 |
| WO | 2004052533 | A1 | 6/2004 |
| WO | 2006000565 | A1 | 1/2006 |
| WO | 2006008434 | A2 | 1/2006 |
| WO | 2008055542 | A1 | 5/2008 |

OTHER PUBLICATIONS

Yin, Hydrothermal Synthesis of Nanosized Anatase and Rutile TiO2 Using Amorphous Phase TiO2, J. Mater Chem, 11, 2001, 1694-1703.

Yu, Formation of Nanoporous Titanium Oxide Films on Silicon Substrates Using an Anodization Process, Institute of Physics Publishing, Nanotechnology 17, 2006, pp. 808-814.

Gennari, Kinetics of the Anatase-Rutile Transformation in TiO2 in the Presence of Fe2O3, Journal of Materials Science 33, 1998, pp. 1571-1578.

Penpolcharoen, Role and Fate of Hematite in Titania Coated Hermatite Photocatalysts, J. Adv. Oxide Technol. vol. 5, No. 1, 2002, pp. 93-106.

Patent Cooperation Treaty, Notification Concerning Transmittal of international Preliminary Report on Patentability and Written Opinion of the International Searching Authority, in PCT/EP2008/053852, dated Oct. 19, 2010.

* cited by examiner

GRANULATE HAVING PHOTOCATALYTIC ACTIVITY AND METHODS FOR MANUFACTURING THE SAME

This application is a 371 National Phase filing of International Patent Application Serial No. PCT/EP2008/053852 filed Mar. 31, 2008. This application is incorporated herein by reference in its entirety.

The invention relates to a granulate having photocatalytic activity, comprising at least one inorganic particulate material, the particles of the inorganic particulate material being at least partially coated with a photocatalytically active compound. The invention further relates to processes for the manufacture of such granulates and their use for introducing photocatalytic activity into building materials based on cement, concrete, mortar, limestone and gypsum or water-based coatings and paints.

At present, mainly pastes and powders are used for introducing photocatalytic activity and/or colouring into or on building materials, for example cement-bound building materials such as concrete. In this regard materials in shaped form such as granulates, pellets, tablets etc. exhibit substantial advantages compared to powders and pastes, e.g., in their handling and dosage, prevention of dust and the like, but also with respect to their dispersing properties. Furthermore, photocatalytic activity has shown to reduce the accumulation and growth of microorganisms and environmental polluting substances on building materials and thus reduces the tendency of fouling of the material, while maintaining the brilliance of the colour. Photocatalytic activity has further shown to reduce the concentration of environmental polluting substances in the environment and thus improves the quality of air and water, i.e. photocatalytic activity provides an anti-smog-effect.

Japanese patent application JP 2001-179109 relates to a photocatalytic granule comprising a mixture of photocatalyst particles such as titanium dioxide and silica particles, which may further comprise a filler such as calcium carbonate, lime or inorganic fiber. Patent application US 2007/0181167 describes a pellet or a solid bar comprising a composition of a photocatalyst combined with a dopant and a pigment such as $TiO_2$, $ZnO$, $Fe_2O_3$, $Fe_3O_4$ or $NiFe_2O_4$. US 2003/0066458 relates to pigment granules comprising a mixture of at least one pigment selected from the group consisting of iron oxides and titanium dioxide.

WO 2006/000565 describes a composite paving comprising a foundation layer, an intermediate layer comprising a resin and a reinforcing material and a surface layer comprising a photocatalytic cement composition. JP 2004-130156 relates to a photocatalyst carrying granule comprising a granular carrier made of a ceramic-made carrier and an inorganic hollow body and depositing a photocatalyst on the granular carrier. JP 2004-161978 describes colloidal particles of silica and photocatalyst-coated pigment particles. WO 01/053228 describes the production of pigment granulates containing binding, dispersion, wetting agents, a silica component and an aliphatic salt by spray drying, extrusion, compacting and the like to obtain shaped pigment particles with enhanced colouring and efflorescence-reducing properties and reduced tendency to blister. Processes for the manufacture of granulates are further known from, e.g., DE-A1 29 40 156, EP-A2 0 191 278, DE-A1 36 19 363, DE-A1 39 18 694, EP-A1 0 567 882, EP-A1 0 657 511, U.S. Pat. No. 6,562,120, US 2004/0040469 and EP-A1 16 20 512.

Thus, there is still a need for adequate materials for introducing photocatalytic activity into or on building materials.

An objective of the present invention is to provide a granulate which can be incorporated into a building material such as cement, concrete, mortar, limestone or gypsum and a granulate which can be applied on a building material in the form of a water-based coating or paint. Another objective of the present invention is to provide a granulate for reducing the accumulation and growth of microorganisms and environmental polluting substances on building materials and thus the tendency of fouling of these materials, while maintaining the brilliance of the colour. A further objective is to provide a granulate for reducing the concentration of environmental polluting substances in the environment and thus improving the quality of the air and water in the form of an anti-smog-effect. Another objective of the present invention is to provide a granulate for the colouring of building materials which combines excellent colouring properties with photocatalytic activity. Another objective is to provide a granulate which is highly concentrated, cost-saving and easy to handle.

These and other objectives of the present invention can be solved by a granulate as described in the present invention, comprising at least one inorganic particulate material, the particles of the inorganic particulate material being at least partially coated with a photocatalytically active compound.

In one embodiment of the present invention the particles of the inorganic particulate material of the granulate are partially coated with the photocatalytically active compound. In another embodiment the particles of the inorganic particulate material of the granulate are completely coated with the photocatalytically active compound. The granulate may further comprise additives and/or another inorganic particulate material in the form of a filler such as gypsum, cement, mortar, limestone or concrete and the like. The granulate is preferably formulated to be mixed with the building material in any desired ratio to achieve the desired photocatalytic activity. Furthermore, the granulate is preferably formulated to be mixed with the building material to be coloured in any desired ratio to achieve the desired photocatalytic activity and colour. Additionally, the granulate is preferably formulated to be applied on the building material in the form of a water-based coating or paint to achieve the desired photocatalytic activity.

The granulate of an exemplary embodiment of the present invention comprises particles of an inorganic particulate material such as an inorganic pigment, limestone, gypsum, concrete, mortar and or cement coated with a photocatalytically active compound, preferably titanium dioxide for introducing photocatalytic activity into or on building materials.

The use of a granulate having photocatalytic activity provides a number of improved properties. First of all, it should be noted that the inventive granulate provides excellent photocatalytic activity when incorporated into a building material such as cement, concrete, mortar, limestone or gypsum and the like. Furthermore, the granulate provides excellent photocatalytic activity when applied on a building material in the form of a water-based coating or paint. Surprisingly, it turned out that the granulate comprising the inorganic particulate material coated with the photocatalytically active compound can have a synergistic effect, i.e., the mixture exhibits an enhanced photocatalytic activity or at least a constant activity for an increased period of time when applied on building materials in the form of water-based coatings or paints or build into building materials such as limestone, gypsum, concrete, mortar or cement and the like. Furthermore, the inventive granulate provides excellent colouring properties when inorganic pigments are used as inorganic particulate material and incorporated into these building materials or water-based coatings and paints. This results in a reduced accumulation and growth of microorganisms and environmental polluting substances, and the tendency of fouling of these building materials is, reduced, while the brilliance of the colour is maintained for a longer period of time. Furthermore, a reduction of the concentration of environmental polluting substances in the environment results in an improved quality of the air and water and provides an anti-smog-effect.

The pigment in the granulate is highly concentrated and therefore large amounts of material do not have to be stored. The granulate is further cost-saving, since additional silos to store different types of cement, i.e., cement with and without the photocatalytically active compound are not needed. Additionally, the granulate offers the advantage that the formation of dust is prevented and it is easy to handle, can be added in desired ratio to a building material such as cement, concrete, mortar, limestone and/or gypsum and water-based coatings or paints and the granulate is present in an amount sufficient to achieve the desired photocatalytic activity. Furthermore, the granulate offers the advantage that it can be incorporated into a building material or applied on a building material in the form of a water-based coating or paint.

In accordance with the present invention, the inorganic particulate material refers to an inorganic particle which is selected from the group consisting of an inorganic pigment, cement, concrete, mortar, limestone and gypsum or mixtures thereof. In a preferred embodiment the inorganic particulate material is an inorganic pigment, while in another embodiment cement, concrete, mortar, limestone and gypsum or mixtures thereof are preferred as inorganic particulate material. In another embodiment the inorganic particulate material comprises a mixture of an inorganic pigment and another inorganic particulate material such as cement, concrete, mortar, limestone and gypsum or mixtures thereof.

The particles of the inorganic particulate material in the form of an inorganic pigment are preferably pigment powder and/or pigment filter cake. The inorganic pigment can be in particular selected from the group consisting of an iron oxide, cobalt oxide, titanium (di)oxide, chromium oxide, zinc oxide, mixed metal oxides and/or carbon black or mixtures thereof. Preferably iron oxides such as yellow iron oxide, red iron oxide, black iron oxide such as goethite, hematite and magnetite, as well as any mixtures thereof are preferred as inorganic pigments. In one embodiment, an inorganic pigment coated at least partially with a photocatalytically active compound is preferred. In another embodiment, an inorganic pigment completely coated with a photocatalytically active compound is preferred.

The iron oxide pigments may have a particle size ranging from 0.01 to 100 microns and may have a surface area ranging from about 5 to 200 $m^2/g$. Examples of suitable iron oxide particles for the granulate of the present invention are iron oxides commercially available from Rockwood, such as Ferroxide® yellow 48, Ferroxide® 49 (yellow iron oxides), Ferroxide® red 212 (red iron oxide), Ferroxide® black 77 (black iron oxide) or AC2544P (transparent yellow iron oxide). The average particle size for the Ferroxide® yellows is 100×500 nm, for both the red and the black iron oxide the particle size is 90-100 nm, while the transparent oxide has a particle size of 10×100 nm.

The particles of the inorganic particulate material in the form of cement comprise all cements as described e.g. in DIN-EN 197-1, wherein the main classes such as portland cement (CEM I), portland composite cements (CEM II), blast-furnace cement (CEM III), pozzolan cement (CEM IV), composite cement (CEM V) and all subclasses are suitable as inorganic particulate material of the present invention. Cements for special needs such as road cement, white cement, water-resisting cement or sulfate-resisting cement are also encompassed by the present invention. In addition, specific properties can be enhanced by altering either the cement-making recipe or the size of the particles, whereby these particles are also suitable as particles of the inorganic particulate material of the present invention. In one embodiment, cement particles coated at least partially with a photocatalytically active compound are preferred. In another embodiment, cement particles completely coated with a photocatalytically active compound are preferred.

The particles of the inorganic particulate material comprise also concrete, which is a construction material that consists of cement such as Portland cement and other cementitious materials such as fly ash and slag cement, aggregates, which are in general coarse aggregates such as gravel, limestone or granite, additionally a fine aggregate such as sand or manufactured sand, water and chemical admixtures such as plasticizers, accelerators, retarders and corrosion inhibitors. In the present invention concrete selected from the group consisting of regular concrete, ready-mix concrete, high-strength concrete, high-performance concrete, self-compacting concrete, shotcrete, pervious concrete, cellular concrete, cork-cement composites, roller-compacted concrete, glass concrete, asphalt concrete, rapid strength concrete, polymer concrete and mixtures thereof are suitable as particles of the inorganic particulate material of the present invention. In one embodiment, concrete particles coated at least partially with a photocatalytically active compound are preferred. In another embodiment, concrete particles completely coated with a photocatalytically active compound are preferred.

The particles of the inorganic particulate material in the form of mortar are essentially a mixture of Portland cement with sand and water, but it can also be based on other cement/binder types and contain other materials such as lime or air-entraining admixtures. Mortar suitable as inorganic particulate material of the present invention comprises mortar selected from the group consisting of Portland cement mortar and cement-sand mortar; cement-sand (plasticised) mortar; masonry cement sand mortar; cement-lime-sand mortar, lime mortar, hydraulic lime mortar, pozzolano mortar, firestop mortar and mixtures thereof. In one embodiment, mortar particles coated at least partially with a photocatalytically active compound are preferred. In another embodiment, mortar particles completely coated with a photocatalytically active compound are preferred.

Limestone or gypsum are also suitable particles of the inorganic particulate materials for the granulate of the present invention. In one embodiment, limestone and/or gypsum particles coated at least partially with a photocatalytically active compound are preferred. In another embodiment, limestone and/or gypsum particles completely coated with a photocatalytically active compound are preferred.

Granulates in accordance with the present invention may comprise the particles of the inorganic particulate material in amounts of up to about 80 wt.-%, preferably from about 20 to 80 wt-%, more preferably from about 40 to 80 wt.-% and most preferably from about 60 to 80 wt.-% of the total weight of the granulate.

In accordance with the present invention, a photocatalytically active compound refers to a particle which is capable of exhibiting a photocatalytic function activated by water and/or radiation, such as U.V. or visible light, for preventing an accumulation and growth of microorganisms such as fungus, moss, lichen and algoid organisms on building materials which would otherwise lead to fouling of the material. Building materials are also exposed to environmental polluting substances such as benzene, volatile organic compounds, pesticides, polycyclic aromatic hydrocarbons or nitrogen oxides due to exhaust fumes of cars or industrial waste. Nitrogen oxides ($NO_x$) and volatile organic compounds (VOCs) are two of the major environmental polluting substances. In particular, these compounds are dangerous as they initiate formation of secondary polluting substances. $NO_x$ and VOCs are also referred to as ozone precursors as the majority of tropospheric ozone formation occurs when NO and VOCs react in the atmosphere in the presence of sunlight and carbon monoxide. Moreover, reaction of $NO_x$ and VOCs in the presence of sunlight causes photochemical smog containing inter alia peroxyacetyl nitrate (PAN) which is a significant form of air pollution, especially in the summer. Children, people with lung diseases such as asthma, and people who work or exercise outside are susceptible to adverse effects of photochemical smog such as damage to lung tissue and reduction in lung function. Polycyclic aromatic hydrocarbons (PAH), for example, are derived from the incomplete combustion of organic materials such as carbon, oil, fuel, wood, etc. As demonstrated in several experimental works PAH show mutagenic and carcinogenic activity and, furthermore, several pollutants such as phenanthroquinone can lead to a changed colour of building materials.

Upon exposure to, for example, water and/or sunlight, such polluting environmental substances can be oxidized in the presence of a photocatalytically active compound, which produces radicals and/or other active species which interact with the pollutants. This results in degradation or decomposition reactions of these molecules, e.g., nitrogen oxide gases are oxidized to nitrates, and can substantially reduce concentrations of such pollutants. Thus, the concentration of these substances on building materials is reduced, resulting in a maintained brilliance of the colour for an extended period of time and, furthermore, to a reduced concentration of environmental polluting substances in the environment. Thus the quality of the air can be improved, resulting in an anti-smog-effect.

The photocatalytically active compound may be any compound able to oxidize environmental polluting substances or to prevent the growth and accumulation of microorganisms in the presence of radiation, such as U.V., visible light or even humidity. Preferably, the photocatalytically active compound to be used comprises one or a combination of two or more metal oxides, mixed metal oxides and/or metal sulfides. More preferably, the photocatalytically active compound is selected from the group consisting of a titanium oxide such as titanium dioxide, zinc oxide, zinc sulfide, reactive iron oxides such as iron(II) oxide, strontium titanate, tungsten oxide and tin dioxide, or mixtures thereof.

In particular, titanium oxides such as titanium dioxide, which exhibits a high photocatalytic activity combined with chemical stability and no toxicity are preferred. The granulate of one embodiment of the present invention comprises titanium dioxide mainly in anatase form, i.e., small amounts may also be in a brookit and/or rutil form. For example, suitable coatings of titanium dioxide comprise at least 10 wt.-% of anatase structure, preferably at least 25 wt.-%, more preferably at least 50 wt.-% and most preferably at least 80 wt.-%, referring to the total weight of titanium dioxide, wherein the titanium dioxide is at least partially crystalline, preferably in the form of nano-crystallites.

A preferred crystallinity of titanium dioxide is in the range between 10 and 100 wt.-%, preferably between 20 and 100 wt.-%, more preferably above 30 wt.-% and most preferably above 50 wt.-%, based on the total weight of the titanium dioxide. Because of their large surface area and high photocatalytic activity, preferred embodiments of the present invention comprise titanium dioxide in nanometric dimensions having particle sizes of less than 300 nm, preferably between 1 and 200 nm, and most preferably between 1 and 100 nm and a surface area ranging from about 5 to 350 $m^2/g$, more preferably between 50 and 250 $m^2/g$.

Granulates in accordance with the present invention comprise the photocatalytically active compound in amounts of from about 20 to 99 wt.-%, preferably from about 20 to 60 wt.-% and more preferably from about 20 to 40 wt.-% of the total weight of the granulate.

The coating of the particles of the inorganic particulate material with a photocatalytically active compound can be manufactured by a process as described in applicant's copending application no. PCT/EP2006/068245, wherein an inorganic pigment dispersion such as iron oxide is mixed with an aqueous solution of at least one metal salt such as titanyl salt (titanyl sulfate, titanium chloride or titanyl oxalate) and precipitating a photocatalytically active compound such as titanium dioxide on said inorganic pigment particle by adding an alkali, wherein the metal oxide is precipitated at least partially. Finally, the inorganic pigment particle coated with the photocatalytically active compound is isolated from the reaction mixture by, for example, filtration and subsequent washing and drying at low temperatures.

Suitable solvents or solvent mixtures for the inorganic pigment dispersion may comprise water and organic solvents such as alcohol or a hydrocarbon and any mixtures thereof. The alkali for precipitating the photocatalytically active compound on the inorganic pigment particle is selected from the group consisting of an aqueous solution of sodium hydroxide, potassium hydroxide, sodium carbonate, magnesium hydroxide, ammonium hydroxide or mixtures thereof. The concentration of the solution is preferably relatively concentrated but may be selected in any suitable range. The coated inorganic pigments may then be formed into granulates according to the present invention.

According to the present invention, the particles of the inorganic particulate material are at least partially coated with a photocatalytically active compound, which means that the surface is at least partially covered with the photocatalytically active compound. The photocatalytically active compound can be randomly distributed on the surface of the inorganic particulate material, e.g. in the form of more or less densely distributed crystalline spots, preferably nano-sized crystallites of titanium dioxide or other photocatalytically active compounds. Alternatively, at higher loadings, the photocatalytically active compound may also form larger areas of crystalline material on the carrier particle's surface, up to substantially complete coverage. In preferred embodiments between 10% and 100% of the surface of the particle of an inorganic particulate material is covered with the photocatalytically active compound, preferably between 30 and 100%, more preferably between 50 and 100% and most preferably between 70 and 100% of the surface of the particle of an inorganic particulate material is covered with the photocatalytically active compound.

According to the present invention, "granulate" means every material whose mean grain size in comparison to its raw material has been increased by a processing step, e.g., a shaping operation. Thus, "granulates" comprise spray granulates and compacting granulates as well as, for example, products resulting from a moisture treatment with subsequent curing and pulverizing and products obtained by dry or essentially dry processing steps, resulting in dry products having a residual moisture content of up to about 10 wt.-%. Examples of such processed products are granulates, briquettes, tablets, pellets and others, wherein the particles of the inorganic particulate material are coated with at least one photocatalytically active compound.

Granulates have been used industrially on a large scale for decades, because of their considerable advantages in comparison to powders, pastes, and the like and are also accepted for the processing of pigments. However, experience acquired with granulates in other areas cannot simply be transferred to granulates having photocatalytic activity, since granulates, which appear almost perfectly suitable, often prove inadequate for various reasons.

Granulates require mainly two contrary characteristics, the mechanical stability or solidity on the one hand, and good dispersing properties in the selected medium on the other hand. For most of the prepared granulates an excellent solidity is achieved, which counteracts the destruction of the granulates during, for example, packaging and transport and furthermore restricts the formation of dust. However, the dispersing in the selected medium can be impaired, which results in undesired inhomogeneous photocatalytic activity and photocatalytic activity intensity.

On the other hand, granulates providing good dispersing properties are often too soft and disintegrate before they are worked into a building material such as cement or a water-based coating or paint. This can result in increased dust production, in residues it the packaging, in reduced flowability and correspondingly frequently in incorrect dosages.

The solidity of the granulate is provided by strong adhesive forces and depends mainly on the nature and the amount of a binder, and/or on the pressure applied for their shaping during the granulate production. On the other hand, the dispersing properties are influenced, e.g., by the milling quality prior to the granulation, by the mechanical energy provided in manufacture and by dispersing agents, reducing the adhesive forces of the dry granulate during the incorporation into a building material, water-based coating or paint. However, increased contents of such additives may result in a respective reduction of the pigment concentration and thus the addition of additives is limited. Such additives should not disadvantageously modify the properties of the selected material and thus it has to be carefully evaluated whether the benefits of an additive outweigh the possible disadvantages.

Additives which may be integrated in the present invention are selected from the group consisting of a binder, dispersing agent, disintegration agent, silica, silica component and/or aliphatic salt or a combination of any of these additives.

Additives according to this invention may optionally include a binder and/or dispersing agent such as polyalkylene glycols, propylene oxide/ethylene oxide block polymers, polyacrylates, styrene sulfonic acid polymers, copolymers of styrene sulfonic acid and alpha,beta-ethylenically unsaturated monomers, hydroxycarboxylates, polyethylene sulfonate, copolymers of alpha,beta-ethylenically unsaturated carboxylic acids and straight chain olefins, sulfonates of heavy-duty aromatic hydrocarbons and their formalin condensates, lignin sulfonate, sodium alkylbenzene sulphonate, nonyl phenolethylene oxide condensates, di-octyl sulphosuccinates, salts of naphthalenesulfonate-formalin condensates and salts of melamine sulfonate-formalin condensates, lactose and sugar and the like. Another component for the inventive granulate is water glass, especially potash water glass, which works as a binder and thickening agent when added to the starting mixture for granulation. Silica, preferably in the form of particulate silica and/or particulate alumosilicate can also be used in the present invention. Another class of useful additives which may be used in the present invention are salts of long chain fatty acids. Suitable fatty acids may be saturated or unsaturated and comprising $C_{12}$ to $C_{18}$ fatty acids.

Disintegration agents such as cellulose derivatives comprising native and/or spherical cellulose, dextrans and/or cross-linked polyvinyl pyrrolidone can be used. Furthermore, in an especially preferred embodiment soaps are used, for example, soft soaps and potash soaps, whereby plant-oil-based potash soaps are especially preferred.

However, the additives are chosen in such a way that the granulate becomes suspended and/or is dispersed sufficient quickly and completely in the building material or water-based coatings and paints to be applied on building materials. In this regard, the type of inorganic particulate material, the granulation process, and the further processing steps also play a role, so the mixture suitable in each case is determined through corresponding simple tests.

The additives of the present granulate may represent from about 0.1 to 10 wt.-%, preferably from about 2 to 5 wt.-% of the total weight of the granulate.

As a further component the inventive granulate may also comprise other particles of an inorganic particulate material as a filler, which can be mixed with particles of the inorganic particulate material coated with the photocatalytically active compound.

The particles of an inorganic particulate material in the form of a filler of the present invention are selected from the group consisting of limestone, gypsum, cement, concrete, mortar or mixtures thereof. Preferred embodiments comprise a filler in amounts of up to 80 wt.-%, more preferred are amounts from about 60 to 80 wt.-% of the total weight of the granulate.

The granulates having photocatalytic activity may be used for introducing photocatalytic activity of all building materials used on the interior and/or exterior of a building. The granulates having photocatalytic activity may also be used for the colouring of all building materials used on the interior and/or exterior of a building, where also photocatalytic activity is desired. Preferably, the granulates are used in building materials based on cement, concrete, gypsum, mortar and/or limestone, or in water-based coatings or paints to be applied on building materials, where the accumulation and growth of microorganisms such as fungus, moss, lichen, algoid organisms and the like shall be restricted, thus reducing fouling of the material while the brilliance of the colour of the building material is maintained. The granulate can also be used for introducing photocatalytic activity into a building material such as cement, concrete, gypsum, mortar and/or limestone or mixtures thereof or in water-based coatings and paints to be applied on building materials for reducing the concentration of environmental polluting substances in the environment and, thus, improving the quality of the air and water. The use of the granulate of the present invention is therefore especially preferred for introducing photocatalytic activity into or on building materials, to reduce the tendency of fouling and/or to maintain the brilliance of the colour on the building material for an extended period of time and/or to reduce the concentration of environmental polluting substances in the environment.

For example, when using the granulates of the present invention in building materials or paints, these may be suitable for highly effective photocatalytic decomposition of air polluting substances, particularly nitrogen oxides ($NO_x$) and volatile organic compounds (VOCs). Also with the use of the granulates of the present invention as photocatalysts for degrading $NO_x$ and/or VOC, the $NO_2$ production regularly occurring during the degradation of NO is significantly reduced. Ozone production, that may occur during irradiation with UV and visible light in the presence of $NO_x$, has been measured and observed to be limited with these photo-catalytic materials. Without wishing to be bound to any theory, it is believed that upon exposure to sunlight, the polluting substances nitrogen oxides ($NO_x$) and volatile organic compounds (VOC) can be disintegrated in the presence of the inventive granulate, which produces radicals and/or other active species which interact with the pollutants. This results in degradation or decomposition reactions of these molecules, e.g., nitrogen oxide gases can be oxidized to nitrates, and can substantially reduce concentrations of such pollutants.

The granulates of the present invention can be produced by conventional methods.

In accordance with the invention, the manufacturing of the granulate comprises a step of coating the particles of the inorganic particulate material with at least one photocatalytically active compound to enhance the photocatalytic activity of building materials. Another step may comprise the addition of at least one additive selected from the group consisting of a binder, dispersing agent, disintegration agent, wetting agent, silica, silica component and/or aliphatic salt. The process of the present invention further comprises a granulating step, e.g., a step of forming the granulate by compacting, spray drying, extrusion, compressing, pelletizing, briquetting or fluidized bed drying, or by a combination of any of these processes. Preferably, spray processes (e.g., spraying or fluidized bed drying) are used for granulating.

In accordance with the invention, in all of the aforesaid embodiments of the invention the handling, the working into the building material or water-based coatings and paints, the photocatalytic activity, the colour density, and the like can be further influenced advantageously by the surface of the granulate being treated prior to its being mixed with the building materials. In particular, the granulate can be coated with a separating agent and/or a wetting agent. These agents are chosen so that they do not result in clumping and caking of the granulate in the packaging, i.e., they are not too hygroscopic, for example. On the other hand, it is desired that they promote wetting.

The use of granulates during mixing with building materials or water-based coatings and paints corresponds to the customary, known procedures.

EXAMPLE

A granulate with photocatalytic activity was manufactured by the spray drying granulation process using an iron oxide yellow pigment coated with photocatalytically active $TiO_2$ (prepared as described in patent application number PCT/EP2006/068245). The spherical granulates show a main particle size in the range between 100-300 μm, no granulates above 500 μm are present.
Composition of the Granulate:

| Substance | Percent by weight |
|---|---|
| $TiO_2$ | 23% |
| Yellow iron oxide | 73.5% |
| Additives | 3.5% |

A block of concrete coloured by the use of this granulate with photocatalytic activity was prepared and tested regarding the activity in nitrogen oxide conversion. The concentration of $TiO_2$ on cement concentration was calculated to be 1.8%. A conversion of 12.9% NO was observed, with conversion to $NO_2$ limited to 0.6%.

For comparison purposes a block of concrete coloured with a granulate without photocatalytically active component was prepared and tested regarding the activity in nitrogen oxide conversion. A significant conversion of NO and $NO_x$ was not observed.

Building materials mixed with granulates manufactured in this manner exhibit an enhanced photocatalytic activity or a constant activity for an extended period of time and therefore a reduced tendency of fouling of building materials. At the same time, they were characterized by a colour, whose brilliance was maintained for a longer period of time. This was confirmed by outdoor weathering experiments comparing the long term stability of the colour shade of a concrete stone prepared with a photocatalytically active cement (Italcementi Tex.) coloured with 3% (calculated on cement) normal Yellow Iron Oxide and a concrete stone prepared with a normal cement and 5% photocatalytically active Yellow Iron Oxide (iron oxide content in the stone was 3% calculated on cement). As basis for the comparison the b-value of the CIE-Lab system was chosen representing the most important colour parameter "yellow". After a 12 months outdoor weathering the pigmented TX stone showed a negative difference delta b of −1.77 (i.e. loss of brilliance) whereas the stone prepared with the photocatalytically active Yellow Iron Oxide shows even a slight increase of delta b: +0.27, i. e. slightly better brilliance or at least not changed.

The invention claimed is:

1. A granulate material having photocatalytic activity, comprising at least one inorganic particulate material, the particles of the inorganic particulate material being at least partially coated with the photocatalytically active compound, wherein the photocatalytically active compound represents from 20 to 60 wt.-% of the total weight of the granulate and wherein the photocatalytically active compound differs from the inorganic particulate material.

2. The granulate of claim 1, wherein the particles of the inorganic particulate material are completely coated with the photocatalytically active compound.

3. The granulate of claim 1, wherein the particles or the inorganic particulate material are selected from the group consisting of an inorganic pigment, limestone, gypsum, concrete, mortar, cement, and any two or more thereof.

4. The granulate of claim 3, wherein the inorganic pigment is selected from the group consisting of an iron oxide, cobalt oxide, titanium oxide, chrome oxide, zinc oxide, carbon black, and any two or more thereof.

5. The granulate of claim 3, wherein the inorganic pigment comprises an iron oxide.

6. The granulate of claim 3, wherein the inorganic pigment is selected from the group consisting of pigment powder, pigment filter cake, and any combination of two or more thereof.

7. The granulate of claim 1, wherein the particles of the inorganic particulate material represent from 40 to 80 wt. % of the total weight of the granulate.

8. The granulate of claim 1, wherein the photocatalytically active compound is selected from the group consisting of a titanium oxide, zinc oxide, zinc sulfide, iron(II)-oxide, strontium titanate, tungsten oxide, tin dioxide and any two or more thereof.

9. The granulate of claim 1, wherein the photocatalytically active compound comprises titanium dioxide in anatase and/or rutile form.

10. The granulate of claim 9, wherein the titanium dioxide is at least partially crystalline.

11. The granulate of claim 1, wherein the photocatalytically active compound represents 20 to 40 wt.-%, of the total weight of the granulate.

12. The granulate of claim 1, further comprising an additive selected from the group consisting of a filler, binder, dispersing agent, disintegration agent, silica, silica component, aliphatic salt and any two or more thereof.

13. The granulate of claim 12, wherein the additive represents from 0.1 to 10 wt.-% of the total weight of the granulate.

14. A photocatalytically active building material comprising a base material selected from the group consisting of cement, concrete, gypsum, limestone, a water-based coating, a paint, and two or more thereof with the granulate material of claim 1.

15. A photocatalytically active building material comprising an object made of material comprising cement, concrete, gypsum, limestone, or a combination of two or more thereof at least partially coated with a water-based coating comprising the granulate material of claim 1.

16. A method for reducing the concentration of environmental polluting substances in the environment, comprising contacting the building material of claim 15 with an environment containing nitrogen oxides ($NO_x$), volatile organic compounds (VOCs), or a combination thereof.

* * * * *